(12) United States Patent
Thorwarth

(10) Patent No.: US 10,392,063 B2
(45) Date of Patent: Aug. 27, 2019

(54) MANUFACTURING PLANT, CONVEYING SYSTEM AND METHOD

(71) Applicant: KUKA SYSTEMS GMBH, Augsburg (DE)

(72) Inventor: Paul Thorwarth, Augsburg (DE)

(73) Assignee: KUKA SYSTEMS GMBH, Augsburg (DE)

( * ) Notice: Subject to any disclaimer, the term of this patent is extended or adjusted under 35 U.S.C. 154(b) by 162 days.

(21) Appl. No.: 15/123,771

(22) PCT Filed: Mar. 6, 2015

(86) PCT No.: PCT/EP2015/054707
§ 371 (c)(1),
(2) Date: Sep. 6, 2016

(87) PCT Pub. No.: WO2015/132379
PCT Pub. Date: Sep. 11, 2015

(65) Prior Publication Data
US 2017/0015374 A1    Jan. 19, 2017

(30) Foreign Application Priority Data

Mar. 6, 2014 (DE) .................... 20 2014 101 003 U

(51) Int. Cl.
*B23P 21/00* (2006.01)
*B62D 65/02* (2006.01)
(Continued)

(52) U.S. Cl.
CPC ............. *B62D 65/18* (2013.01); *B23P 21/004* (2013.01); *B62D 65/022* (2013.01); *B65G 37/00* (2013.01); *B65G 2201/0294* (2013.01)

(58) Field of Classification Search
CPC ................ B23P 21/004; B23P 2700/50; Y10T 29/49829; Y10T 29/53365;
(Continued)

(56) References Cited

U.S. PATENT DOCUMENTS 4,069,764 A * 1/1978 Teyssedre ............... B23P 23/06
                                                        104/172.4
5,044,541 A * 9/1991 Sekine ..................... B23Q 7/14
                                                        219/158
(Continued)

FOREIGN PATENT DOCUMENTS

CH        548 334 A     4/1974
CN       1168309 A     12/1997
(Continued)

*Primary Examiner* — Matthew P Travers
(74) *Attorney, Agent, or Firm* — McGlew and Tuttle, P.C.

(57) ABSTRACT

A manufacturing plant (1), for workpieces (29), includes a plurality of manufacturing stations (2 to 5) and a conveying system (9) for conveying the workpieces within the manufacturing plant (1) and between the manufacturing stations (2 to 5). Mobile automatic conveying devices (13, 14, 15) travel on a conveying path network (11) of a plurality of interlinked conveying paths (10) intersecting each other. The conveying paths (10) are connected to a plurality of manufacturing stations (2 to 5) arranged in a station matrix (8).

13 Claims, 3 Drawing Sheets

(51) Int. Cl.
*B62D 65/18* (2006.01)
*B65G 37/00* (2006.01)

(58) Field of Classification Search
CPC ............ Y10T 29/53378; Y10T 29/534; Y10T 29/53409–53413; Y10T 29/53539–53543; Y10T 29/53048; B62D 65/022; B62D 65/18; B23Q 7/14; B23Q 7/1405; B23Q 7/1415; B23Q 7/1421; B65G 35/00; B65G 37/00; B65G 2812/99
See application file for complete search history.

(56) References Cited

U.S. PATENT DOCUMENTS

| | | | | |
|---|---|---|---|---|
| 5,771,554 | A | * | 6/1998 | Komiya ............... B23P 21/004 29/430 |
| 5,976,199 | A | * | 11/1999 | Wu .................. H01L 21/67017 29/25.01 |
| 7,077,264 | B2 | * | 7/2006 | Rice ...................... B65G 17/20 198/844.1 |
| 7,356,378 | B1 | * | 4/2008 | Huang ............. G05B 19/41895 700/112 |
| 2008/0189939 | A1 | | 8/2008 | Kraus et al. |
| 2011/0168322 | A1 | | 7/2011 | Mariani et al. |
| 2011/0179627 | A1 | * | 7/2011 | Kondo ................. B23P 21/004 29/430 |
| 2014/0353116 | A1 | * | 12/2014 | Kozasa ................. B62D 65/10 198/346.3 |
| 2015/0128397 | A1 | * | 5/2015 | Kozasa ................. B65G 37/00 29/33 K |

FOREIGN PATENT DOCUMENTS

| | | |
|---|---|---|
| CN | 101281404 A | 10/2008 |
| CN | 102076488 A | 5/2011 |
| CN | 102152109 A | 8/2011 |
| DE | 3 614 165 A1 | 10/1987 |
| DE | 20 2005 003 913 U1 | 8/2006 |
| DE | 20 2007 002 365 U1 | 6/2008 |
| DE | 10 2007 009 329 A1 | 8/2008 |
| DE | 20 2007 015 654 U1 | 3/2009 |
| DE | 10 2009 058 125 A1 | 6/2011 |
| EP | 0 140 216 A2 | 5/1985 |
| EP | 2 340 982 A1 | 7/2011 |
| WO | 2013/168706 A1 | 11/2013 |

* cited by examiner

MANUFACTURING PLANT, CONVEYING SYSTEM AND METHOD

CROSS REFERENCE TO RELATED APPLICATIONS

This application is a U.S. National Phase Application of International Application PCT/EP2015/054707 filed Mar. 6, 2015 and claims the benefit of priority under 35 U.S.C. § 119 of German Application 20 2014 101 003.3 filed Mar. 6, 2014, the entire contents of which are incorporated herein by reference.

FIELD OF THE INVENTION

The present invention pertains to a manufacturing plant for workpieces, especially vehicle body parts, wherein the manufacturing plant has a plurality of manufacturing stations and a conveying system for conveying the workpieces within the manufacturing plant and between the manufacturing stations, to a conveying system and to a manufacturing plant method.

BACKGROUND OF THE INVENTION

Manufacturing plants in the form of robot gardens, in which a row of individual robot stations or robot cells are arranged in a row and are permanently interlinked among one another in series by a conveying system with direct workpiece transfer from one station to another, are known from practice.

SUMMARY OF THE INVENTION

An object of the present invention is to show an improved manufacturing technology.

This object is accomplished by the present invention with the features of the principal method claim and of the principal device claim. The manufacturing technology being claimed, i.e., the manufacturing plant and the manufacturing method, offer greater flexibility for the processes to be carried out in a manufacturing plant and for the conveying logistics. The effort needed for setting up and adapting a manufacturing plant and the conveying system to the different processing processes to be carried out in the stations can also be significantly reduced. In addition, advantages arise for a better and more flexible interlinking of manufacturing stations among each other and for the flow of materials or workpieces.

It is advantageous for increasing the flexibility to connect a plurality of manufacturing stations together to one conveying path and to make it possible to actuate them in this manner flexibly with a mobile automatic conveying device on the conveying path. An automatic conveying device can be driverless as well as program-controlled and remote-controlled. The conveying system can also be adapted rapidly, simply and without excessive effort in case of a change in the manufacturing processes and in the material and workpiece flows.

The conveying system may have a conveying line system, in which the automatic conveying device travels in a line-bound manner. Especially favorable is a division of the conveying line system into a plurality of conveying lines closed in a ring-shaped manner, in which one or more conveying device travels in a line-bound manner and preferably in a closed circuit. These configuration variants reduce the effort needed for programming and control for the automatic conveying devices. The conveying devices reach only some of the total number of existing manufacturing stations on their conveying line. This shortens, in addition, their travel paths and ensures better and more rapid availability of a conveying device for the particular conveying job.

Especially favorable is the configuration of manufacturing stations with separate input and output interfaces, at which another conveying line is connected. The feeding and removal of workpieces can take place on different conveying lines as a result. The conveying lines may, in addition, be interlinked with one another in terms of the material and workpiece flow via the manufacturing stations.

There are special advantages in the configuration of the manufacturing plant with a station matrix, in which the individual manufacturing stations can be used and programmed in a flexible manner. Each manufacturing station is connected to a preferably branched conveying line in a flexible manner and to assign them to the existing conveying paths. The manufacturing plant as a whole is highly flexible as a result and can be adapted rapidly and in a simple manner as a result in case of changes in the process. Such a manufacturing plant is preferably used in the bodyshell of vehicle bodies. The high flexibility is especially important for the manufacture of different types of vehicles and vehicle bodies as well as their body parts in a free mix, which frequently occurs in the construction of vehicles. A change in type or a changeover between types can also be implemented rapidly, simply and economically with the manufacturing technology being claimed.

In addition, different manufacturing processes may take place simultaneously in the manufacturing plant. A manufacturing process may be a multistep and station-overlapping process. A plurality of manufacturing processes may join each other and can be interlinked into a manufacturing sequence. The manufacturing stations can be interlinked with one another and with a component supply unit (28) in terms of manufacturing technology via the conveying line system. In a station-overlapping manufacturing process, a conveying line can interlink the manufacturing stations involved in terms of process engineering. A plurality of process-related conveying lines may be interlinked with one another for a manufacturing sequence.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
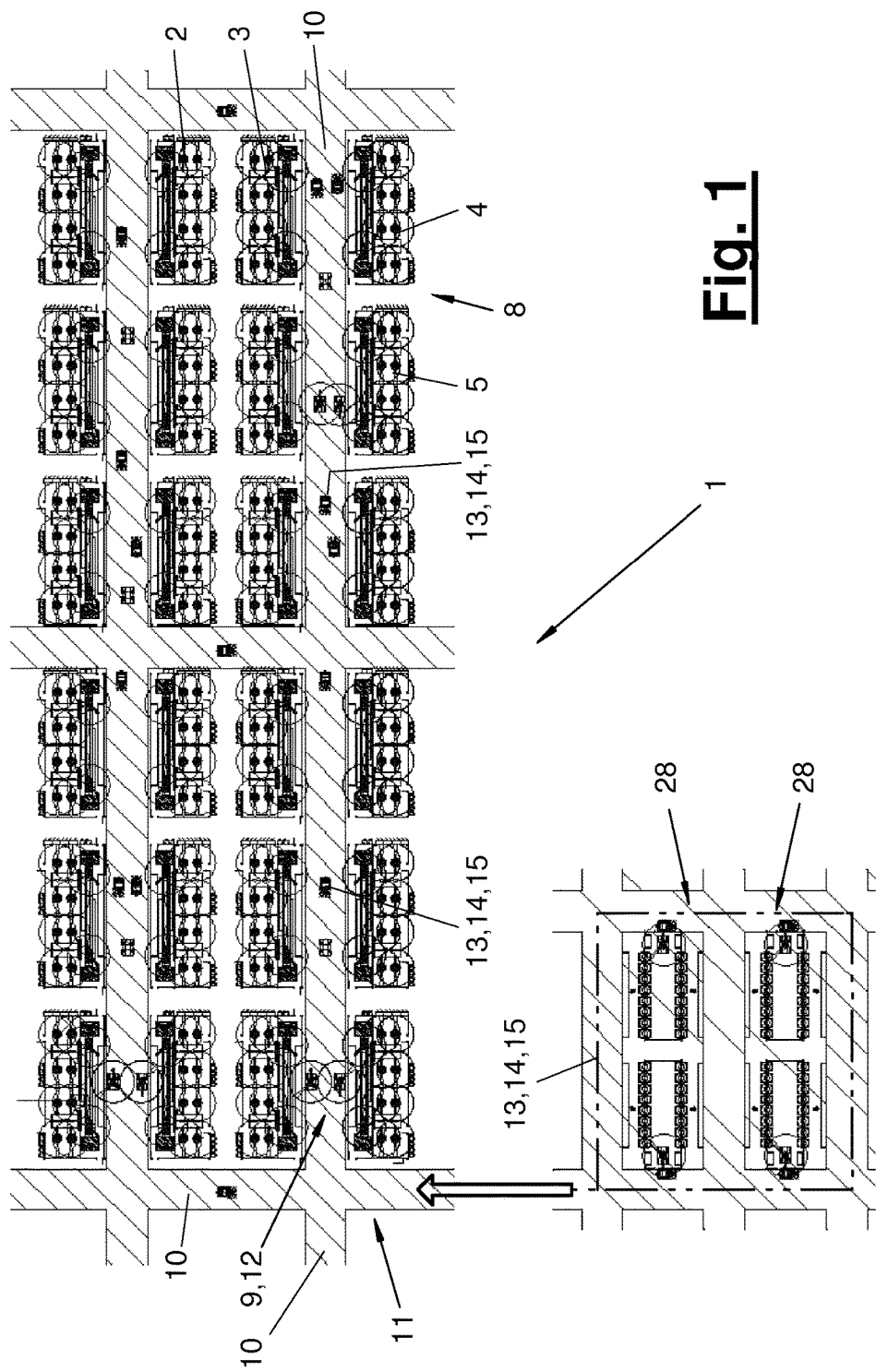
FIG. 1 is a schematic view of a manufacturing plant with a plurality of manufacturing stations and with a conveying system.

Referring to the drawings, the present invention pertains to a manufacturing plant (1) as well as to a manufacturing method. It pertains, furthermore, to a conveying system (9) arranged in the manufacturing plant (1) and to a conveying method.

Figure 3:
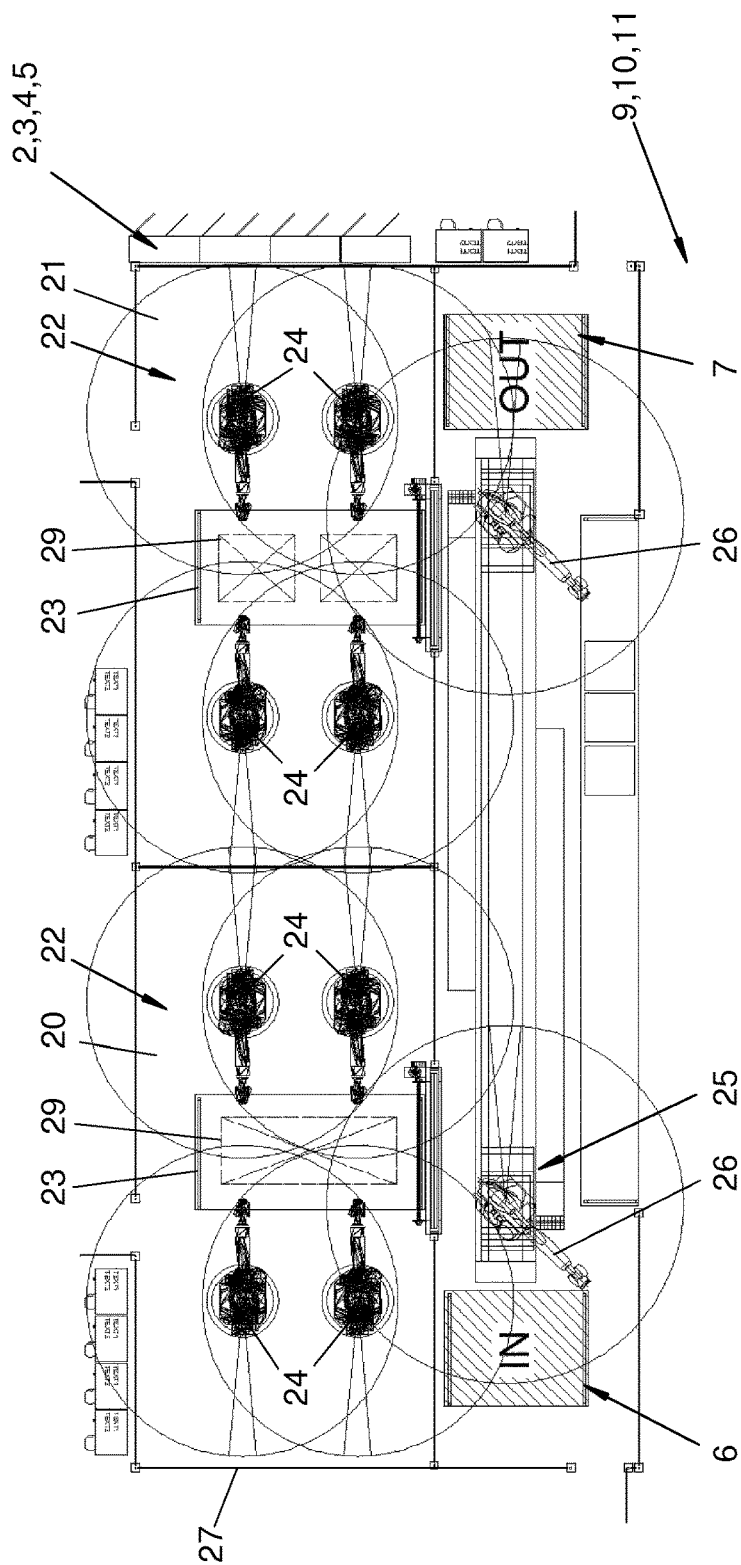
FIG. 3 is a schematic view of a manufacturing station.

FIG. 1 shows a manufacturing plant (1) for workpieces (29) (cf. FIG. 3). The workpieces (29) may be of any desired type and size. They are preferably vehicle bodyshell parts made of sheet metal or other materials for vehicles. The manufacturing plant (1) is configured as a bodyshell plant in the exemplary embodiments being shown.

The manufacturing plant (1) has a plurality of manufacturing stations (2-5) and a conveying system (9) for conveying the workpieces (29) within the manufacturing plant (1) and between the manufacturing stations (2-5). The manufacturing plant (1) may have, in addition, additional stations, e.g., the stations for component supply (28), which are indicated in FIG. 1 and which are likewise connected to the conveying system (9). Individual components can be delivered from here for the manufacturing sequences and the manufacturing processes taking place in the manufacturing stations (2-5).

The conveying system (9) has one or more conveying paths (10), to which a plurality of manufacturing stations (2-5) and optionally additional stations, especially the component supply unit (28), are connected. The conveying paths (10) are connected crosswise in the embodiment being shown and form a branched conveying path network (11). A plurality of conveying paths (10) intersecting each other, e.g., at right angles, are present in the conveying path network (11). The conveying paths (10) extend along and between the manufacturing stations (2-5). The conveying paths (10) are configured as bottom-side (floor based) travel paths in FIGS. 1 and 2. The manufacturing stations (2-5) point each towards a conveying path (10) with their front side.

The manufacturing stations (2-5) are arranged in a station matrix (8) and are connected to the conveying path network (11). The station matrix (8) may have, as in the embodiment being shown, a regular configuration. It may also have an irregular shape. A plurality of manufacturing stations (2-5) may be arranged in two parallel lines with the rear sides facing one another and form a station block, which is surrounded by conveying paths (10) on the outside. As an alternative, the manufacturing stations (2-5) may be detached and surrounded by conveying paths (10) on all sides.

The conveying system (9) has a conveying device (12) with a plurality of automatic conveying devices (13, 14, 15), which move on the conveying path or conveying paths (10). The automatic conveying devices (13, 14, 15) are driverless and move in a program-controlled and remote-controlled manner. They may have a drive of their own and be individually controllable as well as optionally steerable. They have a suitable receiving and changing device for conveying and transferring one or more workpieces (29) or optionally also one or more workpiece carriers.

The conveying system (9) has a conveying line system (16), in which the automatic conveying devices (13, 14) travel in a line-bound manner. The conveying line system (16) contains preset travel routes, over which the automatic conveying devices (13, 14) travel on the conveying path or conveying paths (10). The conveying line system (16) has a configuration similar to that of a public local traffic system with bus lines. The line-bound nature of the conveying devices (13, 14) means that these move on their respective lines only and do not travel on other paths. The conveying system (9) may, in addition, also have other automatic conveying devices (15), which move outside the conveying line system (16) and are not bound to a line.

Figure 2:
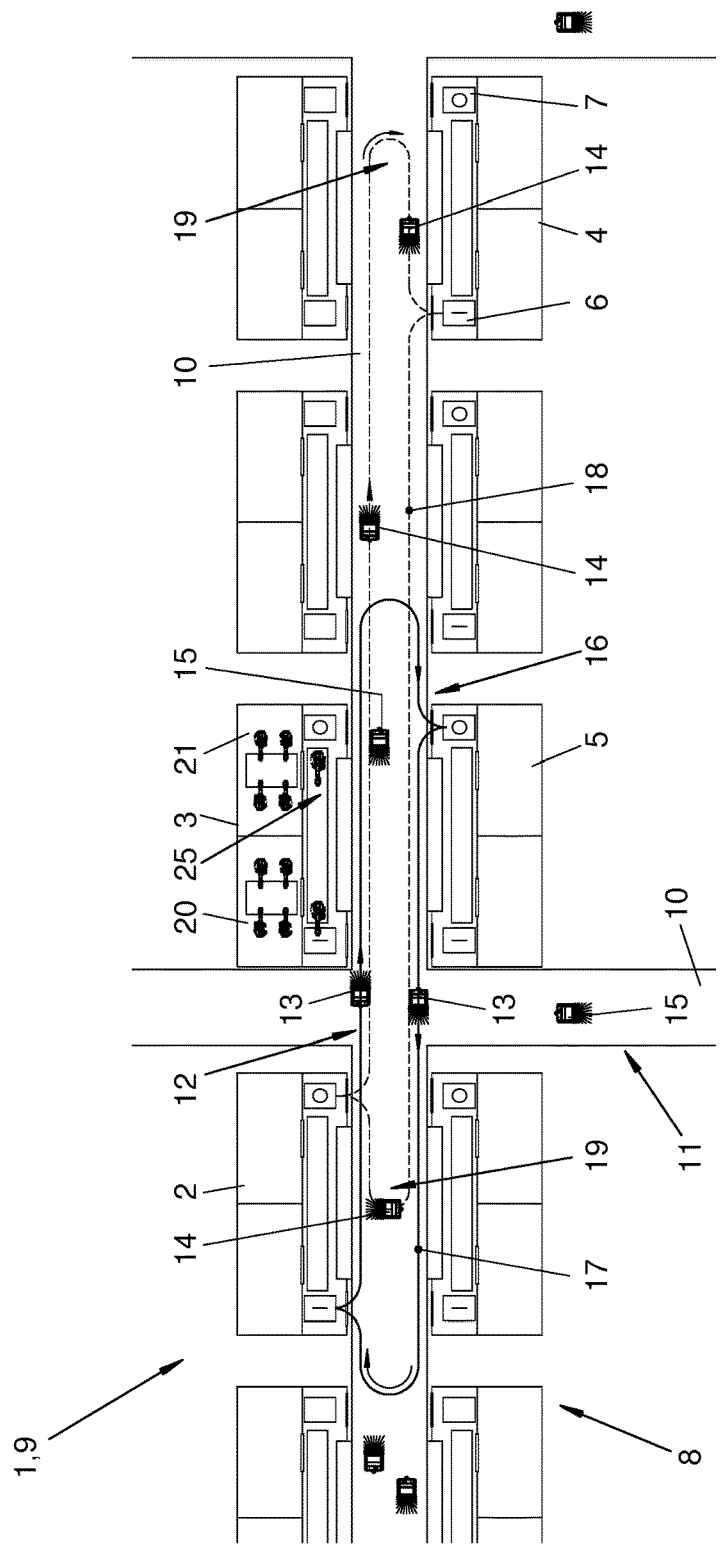
FIG. 2 is a detail view of the manufacturing plant and of a conveying line system with a plurality of automatic conveying device.

FIG. 2 illustrates a detail of the conveying line system (16). In the preferred embodiment, it has a plurality of conveying lines (17, 18), which are closed in a ring-shaped manner and on which an automatic conveying device (13, 14) each travels in a line-bound manner. It preferably moves in a closed circuit along the respective conveying line (17, 18) or the travel route preset here on the conveying path or conveying paths (10). A plurality of conveying devices (13, 14) may also travel on one conveying line (17, 18).

The conveying lines (17, 18) are separated from one another. In the preferred embodiment, the automatic conveying device (13, 14) travel on their own conveying lines (17, 18) only and do not change over to another conveying line.

The conveying lines (17, 18) are selectively connected to individual manufacturing stations (2-5). The number of connected manufacturing stations (2-5) preferably equals two. However, it may also be greater. Due to the division of the lines, only some of the total number of manufacturing stations (2-5) present are connected to a conveying line (17, 18). The conveying lines (17, 18) extend each only over a partial area of the conveying path network (11).

The manufacturing stations (2-5) connected to a conveying line (17, 18) may have a greater distance according to FIG. 2, and one or more other stations may be located between them. The connected manufacturing stations (2-5) may be connected to the same conveying path (10) or to different conveying paths (10) in the path network (11). In a simple variant, directly adjacent manufacturing stations (2-5) may be connected to a common conveying line (17, 18).

The manufacturing stations (2) and (5) are connected to the conveying line (17) in FIG. 2. For example, two automatic conveying devices (13) travel on the conveying line (17). The other conveying line (18) is connected to the manufacturing stations (2) and (4), and, e.g., three automatic conveying devices (14) travel here. The number of automatic conveying devices (13, 14) on one conveying line (17, 18) may also be smaller, e.g., one, or greater, e.g., four, five or more. Only two conveying lines (17, 18) are shown in FIG. 2 for the sake of clarity. In addition, there are many additional such conveying lines.

As is illustrated in FIG. 2, the conveying path or conveying paths (10) is/are configured for the two-way traffic of automatic conveying devices (13, 14, 15). They have, e.g., a correspondingly great width for this. The direction of travel may be preset, e.g., as travel on the right or clockwise.

The conveying lines (17, 18) have the shortest length possible in order to avoid needless travel sections. One or more conveying lines (17, 18) may have a turning site (19) for their automatic conveying device (13, 14) on a conveying path (10) for this purpose. This is favorable for making it possible to service manufacturing stations (2-5) that are arranged on different sides of a conveying path (10). FIG. 2 shows this situation. A plurality of conveying lines (17, 18), which extend in parallel in at least some areas, may also have a common turning site (19), The conveying device (12) may have mutually identical or different automatic conveying devices (13, 14, 15). In addition, a suitable programmable control each is provided for this. Such a control may also be associated with the individual conveying lines (17,18) and provided and configured for the automatic conveying devices (13, 14) traveling there. The control commands, status reports and other signals may be transmitted in different ways, e.g., in a wired or wireless manner. Request signals for a connected conveying line (17, 18) and for a conveying device (13, 14) traveling there can be transmitted to the control(s). The automatic conveying devices (13, 14, 15) may also have detection devices for imminent collisions or other external interfering effects and respond correspondingly. In addition, they have a carried-along or stationary external energy supply, e.g., by means of electric sliding contacts.

An automatic conveying device (13, 14, 15) may be configured, e.g., according to FIG. 2, as a floor-mounted and self-steering vehicle. This may be guided in a positive-locking manner by means of a rail or in a contactless manner, e.g., inductively, by means of a camera system or in another manner. Such a vehicle may be configured, e.g., as a so-called FTF [automate guided vehicle, AGV]. One or more such AGVs may form a line-bound, driverless conveying system, a so-called FTS [automated guided vehicle system], together with the control.

In another variant, which is indicated in FIG. 1, an automatic conveying device (13, 14, 15) may have an overhead conveyor system mounted on pillars with rail-bound vehicles. This may be, e.g., a so-called monorail suspension conveyor MSC. The conveying path (10) and the path network (11) are formed by a rail system here. In addition, additional variants of automatic conveying device (13, 14, 15) are possible as desired.

The different conveying lines (17, 18) are interlinked with one another for the workpiece or material flow via jointly connected manufacturing stations (2-5). For example, a workpiece (29) is picked up from the manufacturing station (5) and brought into the manufacturing station (2) on the conveying line (17), and the automatic conveying device (13) then brings it back to the manufacturing station (5). The processed workpiece (29) is picked up from the manufacturing station (2) with the other conveying line (18) and brought to the manufacturing station (4).

The manufacturing stations (2-5) have an interface (6, 7) each with conveying line connection for transferring the workpieces between the manufacturing station (2-5) and the automatic conveying device (13, 14, 15). This may be an individual and combinative interface, which is provided and configured for both feeding and removing workpieces. Two or more conveying lines may be connected to the same interface.

FIGS. 2 and 3 show another and preferred interface configuration. An input interface (6) is provided here for feeding workpieces and an output interface (7) is provided for releasing workpieces, and these interfaces are arranged separated from one another and at mutually spaced locations. They are arranged at the front of the station along the conveying paths (10) leading past there next to each other. The number of interfaces (6, 7) may also be greater than two.

Different conveying lines (17, 18) are connected to the interfaces (6,7) in this embodiment. For example, the conveying line (17) is connected at the input interface (6) of the manufacturing station (2) and the other conveying line (18) is connected at the output interface (7). They have a correspondingly different function for feeding and removing workpieces (29). The input interfaces (6) are marked by an "I" and the output interfaces by an "O" in FIG. 2.

Unlike in the exemplary embodiment shown, a plurality of conveying lines each, with which, e.g., a plurality of different workpieces (29) are fed and again removed for processing in a manufacturing station (2-5), may also be connected to an input or output interface (6, 7).

The interfaces (6, 7) have each a defined storage site for one or more workpieces (29), at which the transfer to and from an automatic conveying device (13, 14, 15) and optionally the internal conveying logistics (25) can take place. Said workpiece changing device may also be arranged at an interface (6, 7). To transfer a workpiece, an automatic conveying device (13, 14, 15) travels to the interface (6, 7) that is the adjacent interface there and into a defined position suitable for the transfer. To relieve the traffic burden, it may optionally move from the conveying path (10) into the manufacturing station (2-5) and move out and back onto the conveying path (10) after transferring the workpiece. An optionally automatically closable access may be present for this in a station barrier (27) extending peripherally on the outside, e.g., a fence.

The manufacturing stations (2-5) preferably have a modular configuration and have one or more integrated manufacturing cells (20, 21) each and an internal conveying logistics (25), which services the cell(s) (20, 21) and the interface(s) (6, 7). FIG. 3 shows such a manufacturing station (2-5) in an enlarged schematic view.

The one or more manufacturing cells (20, 21) have a process area (22) of their own each with a receiving device (23) for a workpiece (29) and with a plurality of industrial robots (24) arranged next to it for handling the process to be performed on the workpiece (29) received. The receiving device (23) preferably has a controllable clamping device, with which the one-part or multipart workpiece (29) can be positioned and clamped correctly for the process.

Additional components can be fed to the manufacturing station (2-5) by means of possibly present other automatic conveying device (15) via the conveying path network (11) and transferred in a readiness position arranged between the interfaces (6, 7) for receiving individual components or component containers. They can be taken over from here with the internal conveying logistics (25) and fed to the cell or cells (20, 21).

The process areas (22) have a mutually uniform basic configuration of the above-mentioned components and are standardized. Further, there may additionally be a control and supply area likewise having a mutually uniform basic configuration as well as a basic programming, especially also a basic sequence programming. These are not shown in the drawings for the sake of clarity.

The hardware and the basic programming of the individual manufacturing station (2-5) can be process-neutral as a result. The process adaptation is performed by the use of suitable and changeable process tools, i.e., a so-called process tooling, and by a set-up process programming. The manufacturing stations (2-5) can be rapidly configured as a result and also retrofitted, if needed, to other processes and even to other workpieces (29).

The internal conveying logistics (25) has, e.g., one or more industrial robots (26), which are configured as multi-axial handling robots and are optionally arranged on a travel axis along the lined-up cells (20, 21) and in parallel to the conveying path (10) leading past on the other side. They also move between the interfaces (6, 7) and can yield to each other in a two-way traffic.

Various modifications of the embodiments shown and described are possible. In particular, the individual features of the embodiment features and their variants may be combined and especially also replaced with one another as desired.

The manufacturing station (2-5) may have a different configuration. They may do, e.g., without separate internal conveying logistics (25), especially if they have only one manufacturing cell. The process robot or process robots (24)

may carry out feeding and removing functions. Further, the interfaces (6, 7) may be combined into a common interface.

While specific embodiments of the invention have been shown and described in detail to illustrate the application of the principles of the invention, it will be understood that the invention may be embodied otherwise without departing from such principles.

The invention claimed is:
1. A method for manufacturing workpieces in a manufacturing plant, the method comprising the steps of:
    providing the manufacturing plant with a plurality of manufacturing stations and with a conveying system for conveying the workpieces within the manufacturing plant and between the manufacturing stations;
    providing each of the manufacturing stations with a modular configuration, with each modular configuration comprising one or more integrated manufacturing cells, with each of the one or more manufacturing cells having a process area comprising a workpiece receiving device and comprising a plurality of industrial robots arranged adjacent to the workpiece receiving device for processing the received workpiece;
    conveying the workpiece with the conveying system on a conveying path network comprising a plurality of conveying paths connected to one another and intersecting one another and by means of a conveying device with a plurality of automatic conveying devices that are movable automatically as driverless, programmed and remote-controlled conveying devices, on the conveying paths in a conveying line system comprising a plurality of conveying lines of the conveying system, wherein the conveying paths are connected crosswise and form a branched conveying path network wherein the conveying paths extend along and between the manufacturing stations;
    configuring the conveying paths as floor based travel paths that are connected to the plurality of manufacturing stations arranged in a station matrix with the automatic conveying devices each being configured as floor-mounted and self-steering vehicles with contactless guidance;
    providing each of the manufacturing stations with an interface arrangement, wherein each interface arrangement comprises a conveying line connection with at least one of the conveying paths in the conveying line system for transferring workpieces between the manufacturing station and one of the automatic conveying devices and with each interface arrangement comprising an input interface located at a spaced location from or spatially combined with a functionally separate output interface with the input interface connected to at least one of the plurality of conveying lines and with the output interface connected to at least a different one of the plurality of conveying lines;
    providing each of the automatic conveying devices or each of the interface arrangements with a changing device and transferring one or more workpieces or one or more workpiece carriers between the automatic conveying devices and the manufacturing stations with the changing device;
    providing each of the manufacturing stations with an internal conveying logistics comprising one or more industrial, multiaxial, handling robots conveying between the one or more cells, the input interface and the output interface; and
    providing each of the manufacturing stations with a station barrier extending peripherally on an outside of each respective manufacturing station.

2. A method in accordance with claim 1, wherein each conveying line is closed in a ring-shape, and is line-bound in a closed circuit.

3. A method in accordance with claim 1, wherein the automatic conveying devices travel only on their own respective conveying lines of the conveying line system and do not change over into another conveying line.

4. A method in accordance with claim 1, wherein each of the automatic conveying devices is restricted to travel on a respective one of the conveying lines, of the conveying line system, to travel to the manufacturing stations that are individually and selectively connected to the respective one of the conveying lines.

5. A method in accordance with claim 1, wherein the plurality of manufacturing stations and at least one component supply station are interlinked for process engineering by a conveying line of the conveying line system.

6. A method in accordance with claim 1, wherein the plurality of conveying lines, of the conveying line system, are arranged separately.

7. A method for manufacturing workpieces in a manufacturing plant, the method comprising the steps of:
    configuring the manufacturing plant with a plurality of manufacturing stations arranged in a station matrix, each of the plurality of manufacturing stations having a modular configuration, with each modular configuration comprising one or more integrated manufacturing cells, with each of the one or more manufacturing cells having a process area comprising a workpiece receiving device and comprising a plurality of industrial robots arranged adjacent to the workpiece receiving device for processing the received workpiece;
    a plurality of station barriers, each of the station barriers extending peripherally on an outside of each respective manufacturing station;
    providing a conveying path network comprising a plurality of conveying paths configured as floor based travel paths that are connected to the plurality of manufacturing stations and connected to one another, intersect one another, and are connected crosswise to form a branched conveying path network wherein the conveying paths extend along and between the manufacturing stations that comprise the station matrix;
    providing a conveying system for conveying the workpieces within the manufacturing plant and between the manufacturing stations, the conveying system comprising a plurality of automatic conveying devices, each of the plurality of automatic conveying devices being movable automatically as floor-mounted, driverless, programmed and remote-controlled, self-steering vehicles with contactless guidance on the conveying paths in a conveying line system comprising a plurality of conveying lines, with each conveying line comprising a sequence of stations or stops;
    providing each of the manufacturing stations with an interface arrangement, wherein each interface arrangement comprises a conveying line connection with at least one of the conveying paths in the conveying line system for transferring workpieces between the manufacturing station and one of the automatic conveying devices and with each interface arrangement comprising an input interface and a functionally separate output interface, with each input interface connected, as one of the stations or stops, to at least one of the plurality of conveying lines, and with each output interface connected, as one of the stations or stops, to at least a different one of the plurality of conveying lines;

providing each of the automatic conveying devices or each of the interface arrangements with a changing device;

providing each of the manufacturing stations with internal conveying logistics comprising one or more industrial, multiaxial, handling robots, the internal conveying logistics for conveying between the one or more cells, the input interface and the output interface;

conveying one or more workpieces or one or more workpiece carriers with one of the automatic conveying devices, along one of the plurality of conveying lines, to the input interface of one of the plurality of manufacturing stations;

transferring one or more workpieces or one or more workpiece carriers from said one of the automatic conveying devices to said input interface of one of the plurality of manufacturing stations, with the associated changing device;

conveying one or more workpieces or one or more workpiece carriers from said input interface of the one of the plurality of manufacturing stations to a cell of the one or more cells of the one of the plurality of manufacturing stations, with the associated internal conveying logistics;

conveying one or more workpieces or one or more workpiece carriers from said cell of the one or more cells of the one of the plurality of manufacturing stations to the output interface of the of one of the plurality of manufacturing stations, with the associated internal conveying logistics;

transferring one or more workpieces or one or more workpiece carriers from said output interface of the one of the plurality of manufacturing stations to one of the automatic conveying devices, with the associated changing device; and conveying one or more workpieces or one or more workpiece carriers with the one of the automatic conveying devices, along another of the plurality of conveying lines, from said output interface of the one of the plurality of manufacturing stations.

8. A method in accordance with claim 7, wherein each conveying line is closed in a ring-shape and is line-bound in a closed circuit.

9. A method in accordance with claim 8, wherein the automatic conveying devices travel only on their own respective conveying lines of the conveying line system and do not change over into another conveying line.

10. A method in accordance with claim 8, wherein each of the automatic conveying devices is restricted to travel on a respective one of the conveying lines, of the conveying line system, to travel to the connected manufacturing stations that are individually and selectively connected to the respective one of the conveying lines.

11. A method in accordance with claim 7, further comprising the steps of:
providing at least one component supply station;
interlinking the plurality of manufacturing stations and the at least one component supply station for process engineering by another conveying line of the conveying line system.

12. A method in accordance with claim 7, wherein the plurality of conveying lines, of the conveying line system, are arranged separately.

13. A method in accordance with claim 7, wherein each of the plurality of barriers comprises a fence.

* * * * *